United States Patent [19]
Yano et al.

[11] Patent Number: 6,112,033
[45] Date of Patent: Aug. 29, 2000

[54] MULTIPLE-LENS IMAGE PICKUP APPARATUS FOR VIEWING IN STEREOSCOPIC PANORAMIC, AND ORDINARY PHOTOGRAPHING MODES

[75] Inventors: Kotaro Yano, Yokohama; Katsumi Iijima, Hachioji; Sunao Kurahashi, Kawasaki, all of Japan

[73] Assignee: Canon Kabushiki Kaisha, Tokyo, Japan

[21] Appl. No.: 09/175,970

[22] Filed: Oct. 21, 1998

[30] Foreign Application Priority Data

Oct. 29, 1997 [JP] Japan .................................. 9-296625

[51] Int. Cl.$^7$ ..................................................... G03B 41/00
[52] U.S. Cl. ........................... 396/323; 396/326; 396/378; 348/36; 348/42
[58] Field of Search .................................... 396/322, 324, 396/325, 329, 373, 374, 378, 380, 381, 382, 384, 385, 386, 419, 420, 428, 323; 348/36, 42, 46, 47, 49, 50, 51, 54, 333, 334, 335, 337, 341, 344; 359/462, 466, 467, 618, 629

[56] References Cited

U.S. PATENT DOCUMENTS

| | | |
|---|---|---|
| 5,563,807 | 10/1996 | Kashiwagi et al. ...................... 364/525 |
| 5,699,108 | 12/1997 | Katayama et al. ......................... 348/47 |
| 5,732,298 | 3/1998 | Nishizawa et al. ...................... 396/380 |

*Primary Examiner*—David M. Gray
*Attorney, Agent, or Firm*—Fitzpatrick, Cella, Harper & Scinto

[57] ABSTRACT

A multiple lens image pickup apparatus includes a plurality of image pickup systems, a control system, and an optical viewfinder. Each image pickup system is arranged to allow an angle an optical path makes through the system to be changed. The control system selects a stereoscopic photographing mode in which images taken through the plurality of image pickup systems overlap in a large proportion, or a panoramic photographing mode in which images taken through the plurality of image pickup systems overlap in a small proportion. The optical viewfinder selectively sets an observing range in accordance with the photographing mode selected.

20 Claims, 10 Drawing Sheets

MULTIPLE-LENS IMAGE PICKUP APPARATUS FOR VIEWING IN STEREOSCOPIC PANORAMIC, AND ORDINARY PHOTOGRAPHING MODES

BACKGROUND OF THE INVENTION

1. Field of the Invention

The present invention relates to a multiple-lens image pickup apparatus equipped with a plurality of image pickup optical systems.

2. Description of the Related Art

Stereocameras (stereoscopic cameras) including a plurality of image pickup optical systems are known. These stereocameras compose a plurality of image information taken through the plurality of image pickup optical systems for the formation of a stereoscopic image. Panoramic cameras are also made to compose a plurality of image information taken through a plurality of image pickup optical systems for the formation of a panoramic image.

This applicant has also proposed a multiple-lens camera including a plurality of image pickup systems in which the lens-barrel for each image pickup system is set to be rotatable with respect to the camera body to vary the convergence angles for each system. This allows a user to select one of two image pickup modes: a stereoscopic image pickup and a panoramic image pickup.

However, with these known multiple-lens cameras, users experience difficulty in accurately viewing a subject through a viewfinder in the two photographing modes (stereoscopic and a panoramic), that is, operability decreases when photographing a high-accuracy stereoscopic image composition or panoramic image composition.

SUMMARY OF THE INVENTION

Accordingly, the present invention has been developed with a view to eliminating this problem, and it is a first object of this invention to provide a multiple-lens image pickup apparatus equipped with a viewfinder which is capable of accurately viewing a subject in two photographing modes: a stereoscopic photography mode and a panoramic photography mode.

For this purpose, according to a preferred embodiment of this invention, there is provided a multiple-lens image pickup apparatus comprising a plurality of image pickup systems which are variable in their photographing directions, image processing means for selectively setting up or creating a stereoscopic image pickup mode to produce a stereoscopic image by composing a plurality of images taken through the plurality of image pickup systems and a panoramic image pickup mode to produce a panoramic image by composing the plurality of images, and an optical viewfinder whose viewing range is alterable in accordance with the image pickup mode chosen.

A second object of this invention is to optimize the angle of view of an optical viewfinder irrespective of the image pickup mode.

For this purpose, according to a preferred embodiment of this invention, there is provided a multiple-lens image pickup apparatus in which the coincidence in aspect ratio between an image to be photographed and an image viewed through a viewfinder takes place in each of the photographing modes.

A third object of this invention is to provide a multiple-lens image pickup apparatus which reduces the parallax between an image to be photographed and an image viewed through a viewfinder in each of the photographing modes.

A further object of this invention is to provide a multiple-lens image pickup apparatus equipped with a compact viewfinder which is thickness-reducible.

The other objects and features of this invention will become more readily apparent from the following detailed description of the preferred embodiments taken in conjunction with the accompanying drawings.

DESCRIPTION OF THE PREFERRED EMBODIMENT

An embodiment of the present invention will be described hereinbelow with reference to the drawings.

Figure 1:
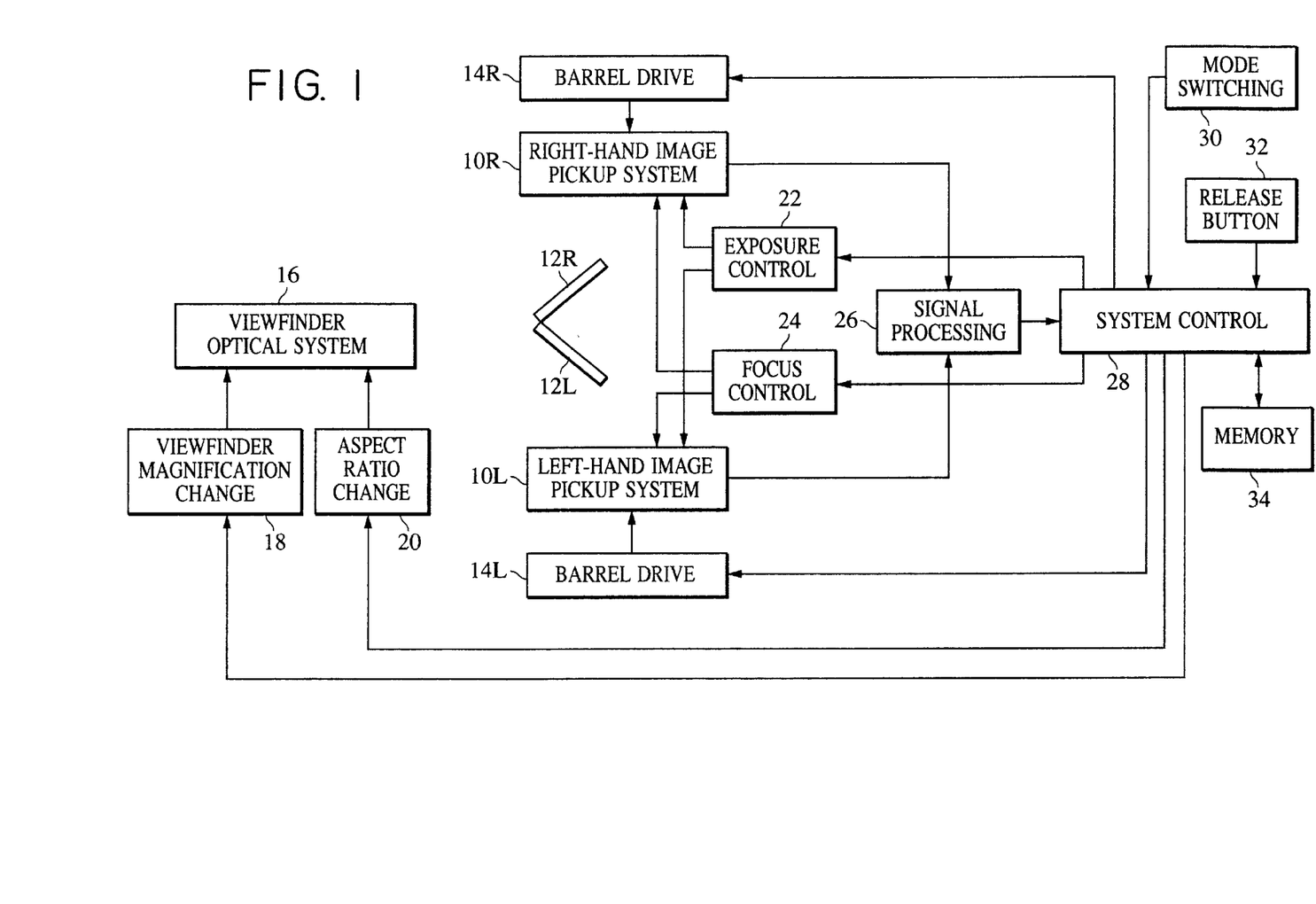
FIG. 1 is a block diagram schematically showing an arrangement of a multiple-lens camera according to an embodiment of the present invention.

FIG. 1 is a block diagram schematically showing an arrangement of a multiple-lens image pickup apparatus according to an embodiment of this invention.

In FIG. 1, reference numerals 10R, 10L designate a right-hand image pickup system corresponding to the right eye and a left-hand image pickup system corresponding to the left eye, respectively, which have the same structure. Each system basically comprises an image pickup lens and an image pickup device. The image pickup lens is equipped with a diaphragm for the adjustment of exposure. The right-hand image pickup system 10R and the left-hand image pickup system 10L are separated by a predetermined distance, and are attached to a camera housing (not shown) to take two conditions: a condition (stereoscopic photographing mode) in which both are directed to the front side and a condition (panoramic photographing mode) in which both turn to each other.

For instance, in the condition shown in FIG. 1, the right-hand image pickup system 10R and the left-hand image pickup system 10L look to the front side. That is, the stereoscopic photographing mode does not use reflecting mirrors 12R, 12L. On the other hand, in the panoramic photographing mode, the image pickup is made through the reflecting mirrors 12R, 12L.

Reflecting mirrors 12R, 12L are put between the right-hand image pickup system 10R and the left-hand image pickup system 10L so that the image pickup of a subject existing on the front side is achievable with a given parallax when the right- and left-hand image pickup systems 10R, 10L look to each other. Assuming that the image pickup lenses of the right- and left-hand image pickup systems 10R, 10L assume a horizontal visual angle (angle of visibility) of e, the reflecting mirrors 12R, 12L are disposed in a contacting relation to each other in a state of making an angle between them of more than $(\pi-\theta)/2$ but approximately $(\pi-\theta)/2$.

In the following description of this embodiment, a portion comprising the image pickup systems 10R, 10L and the reflecting mirrors 12R, 12L will be referred to as a multiple-lens camera head section.

Furthermore, reference numerals 14R, 14L denote barrel drive units for respectively rotationally driving the lens-barrels of the right- and left-hand image pickup systems 10R, 10L to change the angles of the optical axes of the right- and left-hand image pickup systems 10R, 10L. Numeral 16 depicts a viewfinder optical system for viewing a subject. The positional relationship to the multiple-lens camera head section will be discussed below. Further, numeral 18 represents a viewfinder magnification changing unit for changing the magnification of the viewfinder optical system 16, and numeral 20 signifies an aspect ratio changing unit for changing the aspect ratio of the visual field viewable through the viewfinder optical system 16.

In addition, numeral 22 represents an exposure control unit for controlling the exposure in the right- and left-hand image pickup systems 10R, 10L in accordance with the brightness of a subject, and numeral 24 designates a focus control unit for adjusting the focus in the right- and left-hand image pickup systems 10R, 10L with respect to a subject to be picked up. Further, numeral 26 denotes a signal processing circuit for conducting predetermined image processing on image (picture) signals from the right- and left-hand image pickup systems 10R, 10L.

Furthermore, numeral 28 designates a system control circuit based upon a microcomputer for controlling the whole, numeral 30 depicts a mode change-over switch which gives an instruction to the system control circuit 28 for the switching of the photographing mode, numeral 32 signifies a release switch for giving an instruction for photographing, and numeral 34 represents a memory unit for storing image information. Various types of storage mediums such as a solid memory, a magnetic disk, an optical disk, a magneto-optical disk and a magnetic tape are acceptable as the memory unit.

In this embodiment, three kinds of photography: stereoscopic photography, panoramic photography, and ordinary photography, are possible, which will respectively be referred hereinafter to as a stereoscopic photographing mode, a panoramic photographing mode and an ordinary photographing mode. In the ordinary photographing mode, the use of only one of the right- and left-hand image pickup systems 10R, 10L is possible, and in this embodiment, let it be assumed that the left-hand image pickup system 10L is placed to use. The directions (positions) of the image pickup systems 10R, 10L in the ordinary photographing mode are the same as those in the stereoscopic photographing mode.

Figure 2:
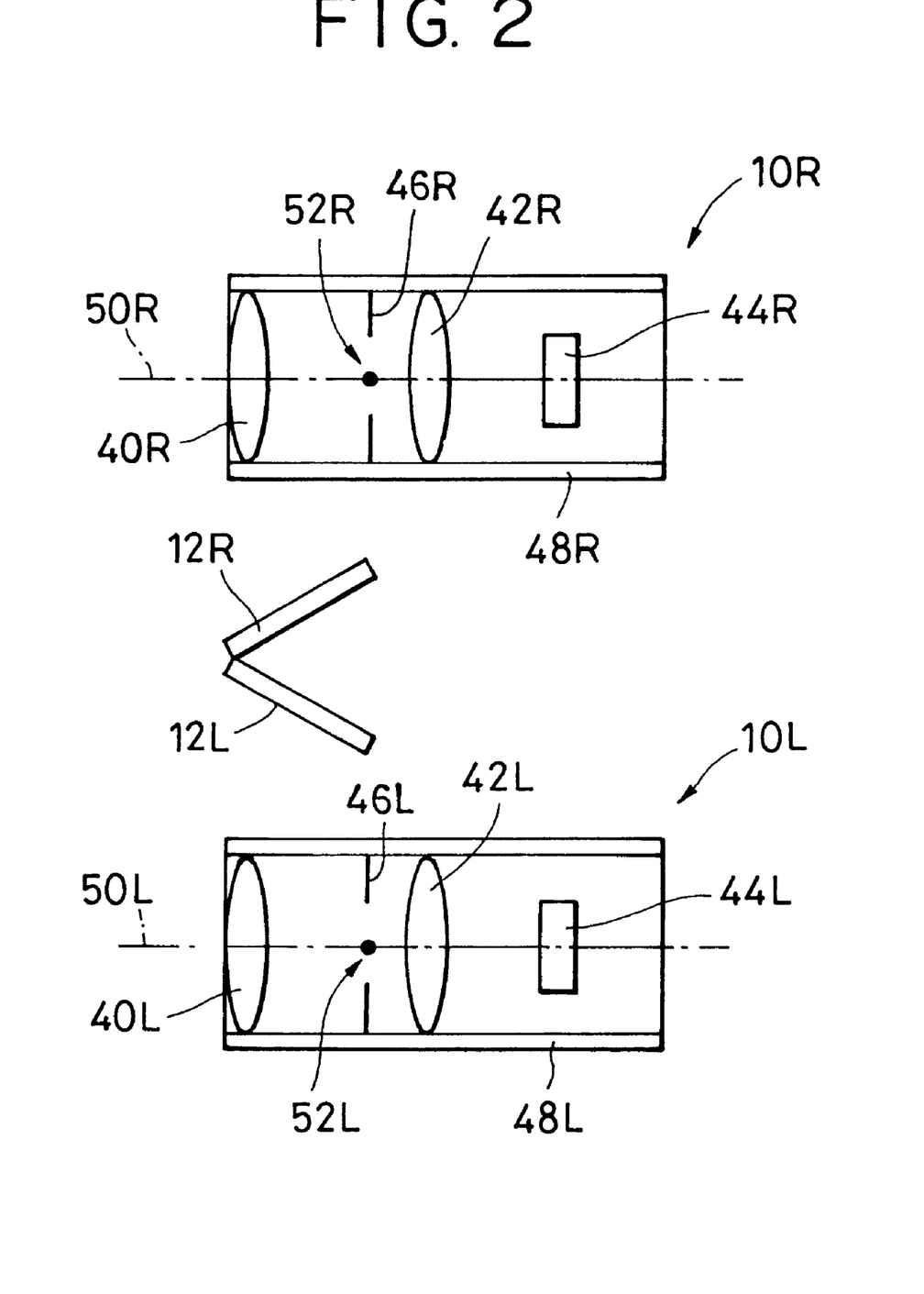
FIG. 2 is an illustration of disposition of a head section of the multiple-lens camera according to this embodiment, in a stereoscopic photographing mode (and in a common photographing mode)
Figure 3:
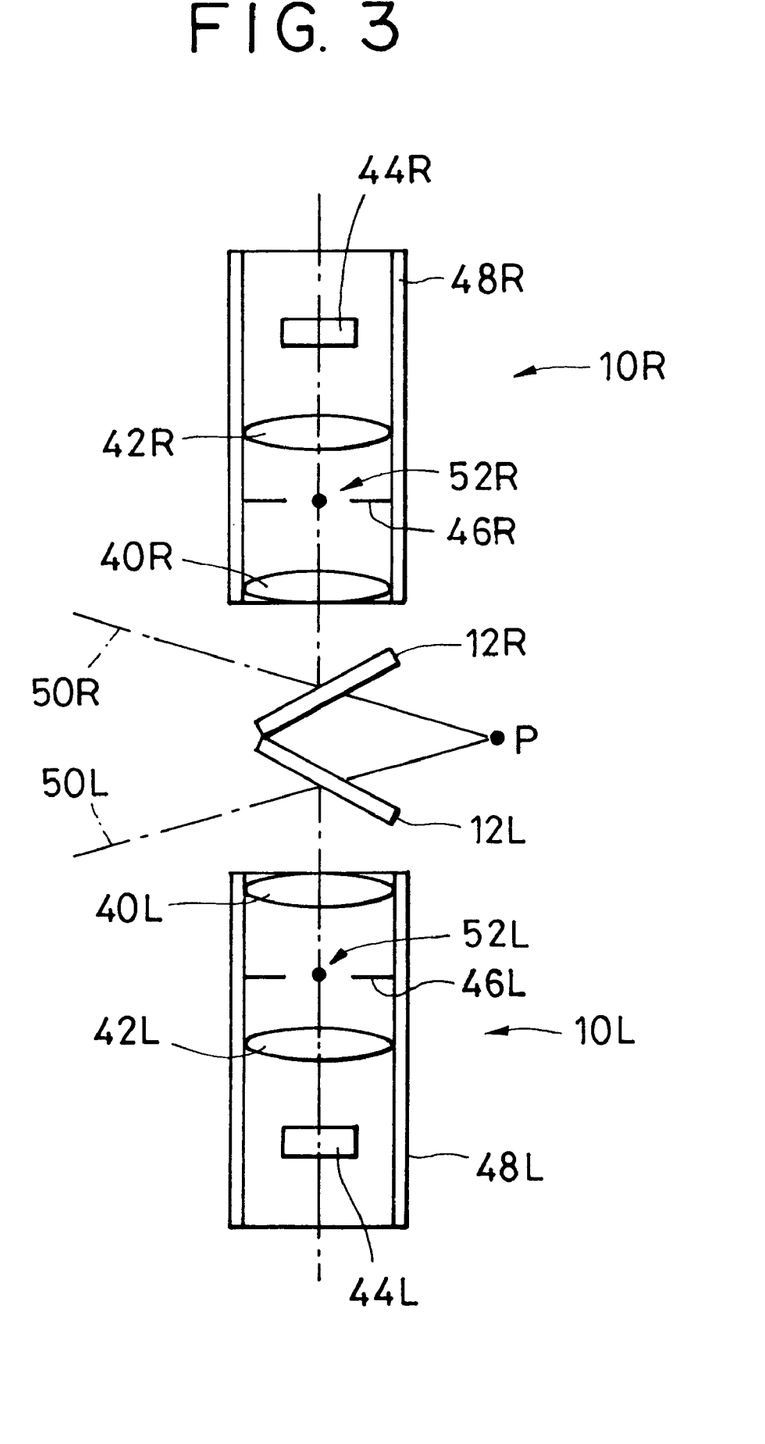
FIG. 3 is an illustration of an disposition of the head section of the multiple-lens camera according to this embodiment, in a panoramic photographing mode.

FIG. 2 shows the directions of the right- and left-hand image pickup systems 10R, 10L in the stereoscopic photographing mode (and in the ordinary photographing mode), and further illustrates their internal structures, and FIG. 3 shows the directions of the right- and left-hand image pickup systems 10R, 10L in the panoramic photographing mode, and further illustrates their internal structures.

In FIGS. 2 and 3, numerals 40R, 42R and 40L, 42L respectively denote lenses within a photographing lens system, and particularly, the lenses 42R and 42L serve as a focus lens for focusing. Further, numerals 44R, 44L represent image pickup devices which output an image signal with a scene aspect ratio of 3:4 in this state. Incident light quantity adjusting diaphragms 46R, 46L are respectively placed between the lenses 40R and 42R and between the lenses 40L and 42L. The lenses 40R, 42R, the image pickup device 44R and the diaphragm 46R are housed in the interior of a lens barrel 48R, while the lenses 40L, 42L, the image pickup device 44L and the diaphragm 46L are housed in the interior of a lens barrel 48L. Numerals 50R, 50L represent the optical axes of the right- and left-hand image pickup systems 10R, 10L, respectively, while numerals 52R, 52L designate intersection points (which will be referred hereinafter to as viewing points) between the incident light on the right- and left-hand image pickup systems 10R, 10L and the optical axes 50R, 50L thereof, respectively.

In FIG. 2 showing the stereoscopic photographing mode, the right- and left-hand image pickup systems 10R, 10L are placed so that their optical axes are substantially parallel to each other. That is, the right- and left-hand image pickup systems 10R, 10L face in substantially the same equal direction. This arrangement of the image pickup systems in the stereoscopic photographing mode results in the images taken through the image pickup systems 10R and 10L overlapping in a large proportion.

In the panoramic photographing mode, as shown in FIG. 3, the right- and left-hand image pickup systems 10R, 10L are disposed to be in opposed relation to each other with respect to the reflecting mirrors 12R, 12L, that is, disposed so that their optical axes 50R, 50L lie on a straight line. At this time, a light beam from the subject is incident on the reflecting mirrors 12R, 12L and then reflected thereon to come in the right- and left-hand image pickup systems 10R, 10L. Character P signifies a virtual image position where the viewing point 52R of the right-hand image pickup system 10R substantially coincides with the viewing point 52L of the left-hand image pickup system 10L. Accordingly, the panoramic photographing mode allows photographing a range of an aspect ratio of 3:8 with the approximately double visual field in the horizontal direction in a state where the point P is substantially equidistance from the viewing points 52R, 52L of the right- and left-hand image pickup systems 10R, 10L is taken as a viewing point. This arrangement of the image pickup systems in the panoramic photographing mode results in the images taken through the image pickup systems overlapping in a small proportion. However, for certainly conducting the processing of composing the right- and left-hand images, an overlapping area therebetween is formed.

Figure 4:
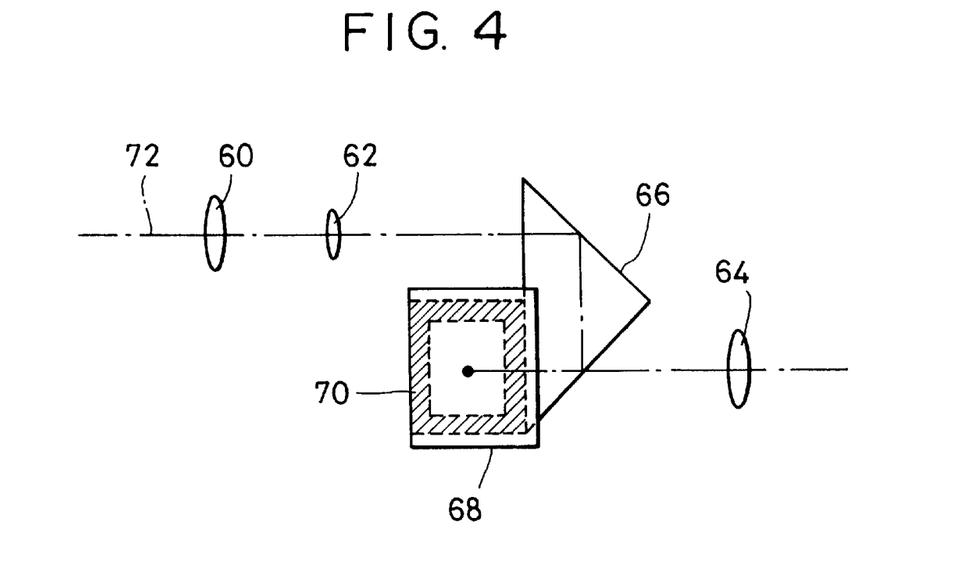
FIG. 4 is a top view showing one example of a viewfinder optical system 16 in this embodiment.
Figure 5:
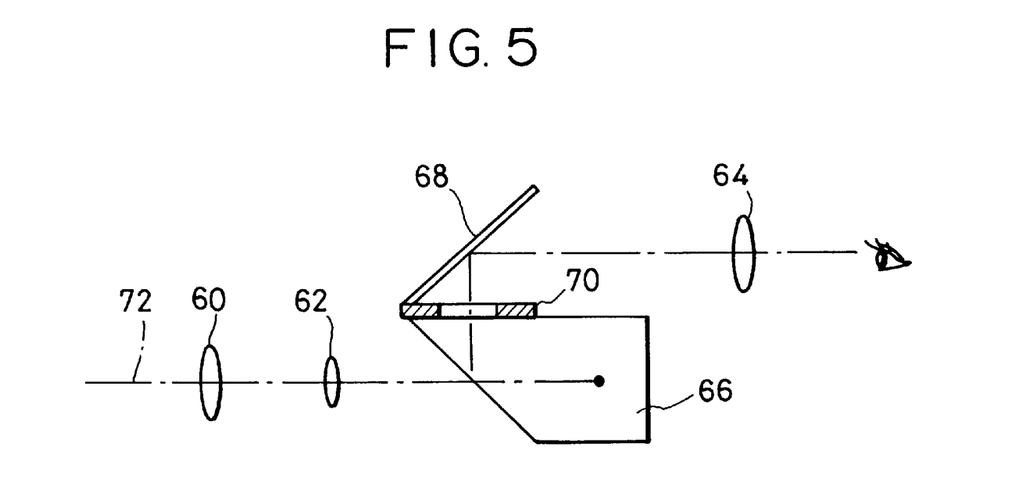
FIG. 5 is a side view showing one example of the viewfinder optical system 16 in this embodiment.

FIG. 4 is an illustration of an arrangement of the viewfinder optical system 16 viewed from above, and FIG. 5 is an illustration of an arrangement of the viewfinder optical system 16 viewed from the side. In these illustrations, numeral 60 represents an objective, numeral 62 designates a variable-power lens, numeral 64 denotes an eyepiece, numeral 66 depicts a prism, and numeral 68 stands for a reflecting mirror. Further, numeral 70 designates a visual field mask which is located in the vicinity of the image formation plane of a lens group comprising the objective 60 and the variable-power lens 62. Still further, numeral 72 indicates the optical axis of the viewfinder optical system 16. The variable-power lens 62 is shifted along the optical axis 72 by means of the viewfinder magnification changing unit 18. The visual field mask 70 is designed so that its mask configuration is changeable through the aspect ratio changing unit 20.

Figure 6A:
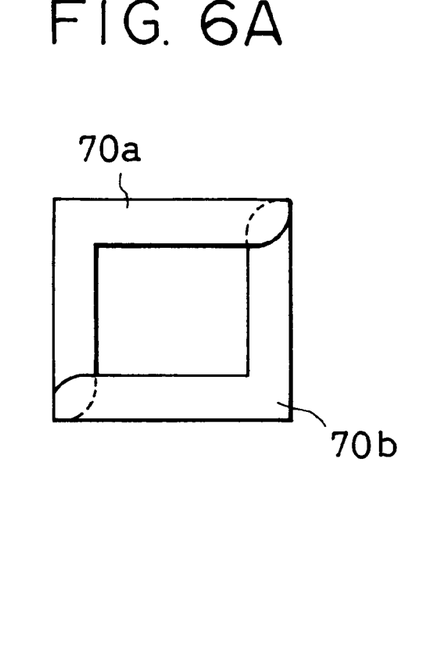
FIGS. 6A and 6B are illustrations of a configuration of a visual field mask and a variation thereof.
Figure 6B:
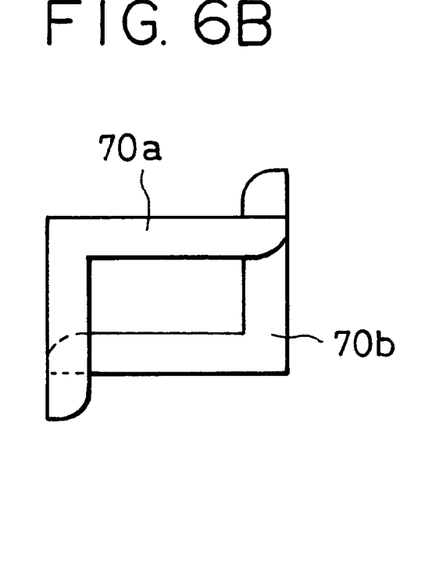

FIGS. 6A and 6B are top views showing the variation of the configuration of the visual field mask 70, and FIG. 6A shows the mask configuration in the stereoscopic photographing mode and in the ordinary photographing mode, while FIG. 6B illustrates the mask configuration in the panoramic photographing mode. The visual field mask 70 comprises two L-shaped pieces 70a, 70b, and the variation of the relative positional relationship therebetween makes the change in the mask configuration, that is, the change in the aspect ratio. In the case shown in FIG. 6A, the aspect ratio is 3:4, whereas, in the case shown in FIG. 6B, the aspect ratio changes to 3:8.

Figure 7:
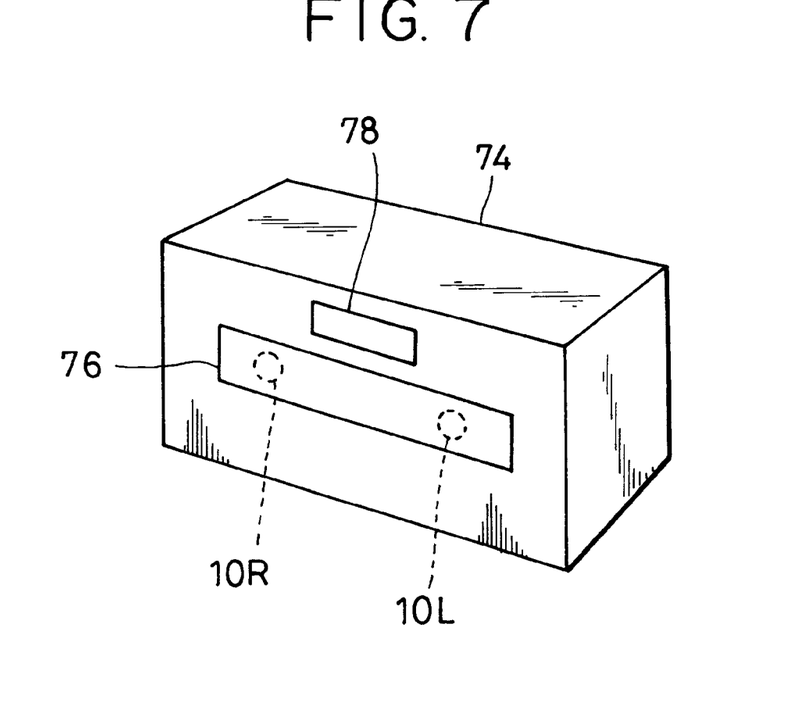
FIG. 7 is a perspective view showing an appearance of this embodiment where a viewfinder optical system 16 is used as the viewfinder optical system shown in FIGS. 4 and 5.

FIG. 7 is a perspective view showing an appearance of a multiple-lens camera according to this embodiment. In FIG. 7, numeral 74 designates a camera housing, numeral 76 denotes a photographing window for the right- and left-hand image pickup systems 10R, 10L, which also acts as a cover glass for protecting the right- and left-hand image pickup systems 10R, 10L against dust or the like. Further, numeral 78 depicts an observing window of the viewfinder optical system 16, which is situated in the vicinity of the photographing window 76 and at the position being at the equal distance from the right- and left-hand image pickup systems 10R, 10L. The visual field of the viewfinder optical system 16 is designed to minimize the parallax with respect to the photographing visual field in the stereoscopic photographing mode and in the panoramic photographing mode.

Figure 8:
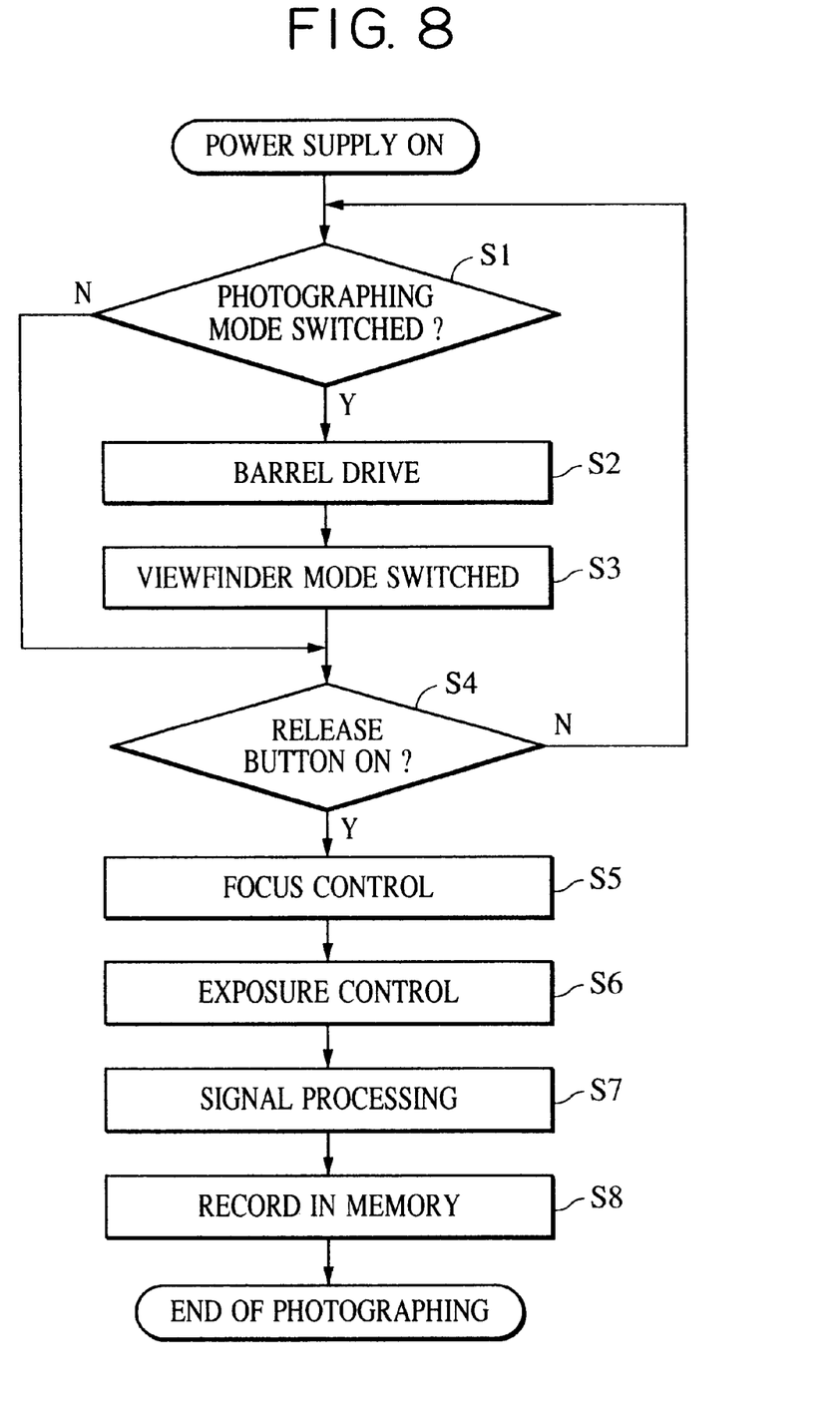
FIG. 8 is a flow chart showing an operation of this embodiment.

A description will be given hereinbelow of an operation of this embodiment. FIG. 8 is a flow chart showing an operation of this embodiment. Unless otherwise mentioned, the system control circuit 28 takes charge of the control for this operation.

When a non-shown power switch turns on, the apparatus according to this embodiment goes into a ready condition (steps S1 to S4). In this photographing ready condition, the mode change-over unit 30 can switch the photographing mode to the stereoscopic photographing mode, the panoramic photographing mode or the ordinary photographing mode (step S1). If the photographing mode chosen is the stereoscopic photographing mode or the ordinary photographing mode, the system control circuit 28 drives the barrels of the right- and left-hand image pickup systems 10R, 10L by means of the barrel drive units 14R, 14L to the positions shown in FIG. 2, whereas, if the photographing mode chosen is the panoramic photographing mode, the system control circuit 28 drives the barrels of the right- and left-hand image pickup systems 10R, 10L by means of the barrel drive units 14R, 14L to the positions shown in FIG. 3 (step S2). In addition, the system control circuit 28 moves the variable-power lens 62 of the viewfinder optical system 16 by the viewfinder magnification changing unit 18 to alter the magnification of the viewfinder optical system 16, and the aspect ratio changing unit 20 shifts the L-shaped pieces 70a, 70b of the visual field mask 70 through the use of the aspect ratio changing unit 20 to alter the aspect ratio of the viewfinder optical system 16 (step S3).

In this embodiment, when switching is made from the stereoscopic photographing mode or the ordinary photographing mode to the panoramic photographing mode, the variable-power lens 62 is moved along the optical axis 72 toward the object to double the viewfinder visual field to the wide-angle side so that the aspect ratio of the visual field mask is changed from 3:4 to 3:8 as shown in FIG. 6B. When the switching is made from the panoramic photographing mode to the stereoscopic photographing mode or the ordinary mode, the change is made in the opposite way.

When the release button 32 is operated (step S4), the system control circuit 28 controls the focus through the focus control unit (circuit) 24 (step S5). In this embodiment, in the stereoscopic photographing mode or the ordinary photographing mode, the image signals output from the image pickup devices 44R, 44L of the right- and left-hand image pickup systems 10R, 10L are digitized in the signal processing circuit 26, and the system control circuit 28 detects the difference between the phases at the central portions of the image data from the right- and left-hand systems and supplies the phase difference to the focus control circuit 24. The focus control circuit 24 estimates the subject distance based on the detected phase difference, and moves the focus lenses 42R, 42L of the right- and left-hand image pickup systems 10R, 10L along the optical axes 50R, 50L up to the positions corresponding to the subject distance so that the right- and left-hand image pickup systems 10R, 10L are focused on the subject. In the panoramic photographing mode, the focus control circuit 24 moves the focus lenses 42R, 42L of the right- and left-hand image pickup systems 10R, 10L along the optical axes 50R, 50L to given positions (for example, the infinite subject distance).

Subsequently, the exposure control is done (step S6). More specifically, the signal processing circuit 26 digitizes the image signals outputted from the image pickup devices 44R, 44L of the right- and left-hand image pickup systems 10R, 10L, and the system control circuit 28 calculates the brightness of the subject based on the image data within given photometric areas of the images from the right- and left-hand image pickup systems 10R, 10L, and supplies the calculation result to the exposure control circuit 22. The exposure control circuit 22 determines the apertures by the diaphragms 46R, 46L of the right- and left-hand image pickup systems 10R, 10L and the exposure times (shutter speeds) for the image pickup devices 44R, 44L in accordance with the information about the subject brightness and adjusts the diaphragms 46R, 46L for achieving the apertures, thereafter performing the exposure for the image pickup devices 44R, 44L for the exposure times.

The signal processing circuit 26 digitizes both the image signals outputted from the image pickup devices 44R, 44L due to the exposure in the step S6, and sends them to the system control circuit 28 after conducting the processing corresponding to the photographing mode (step S7). The system control circuit 28 stores the image data from the signal processing circuit 26 in the memory 34 (step S8). In the stereoscopic photographing mode, the right image data due to the right-hand image pickup system 10R and the left image data due to the left-hand image pickup system 10L are outputted as different image data from the signal processing circuit 26 to be stored in the memory 34. On the other hand, in the panoramic photographing mode, the signal processing circuit 26 composes the right image data and the left image data in the horizontal direction to produce panoramic image data with an aspect ratio of 3:8 which is in turn, is outputted to the system control circuit 28, with this panoramic image data being stored in the memory 34. In the ordinary photographing mode, the signal processing circuit 26 supplies only the left image data to the system control circuit 28, with only the left image data being stored in the memory 34.

In this embodiment, through the use of the aspect ratio changing unit 20 and the visual field mask 70, the image taken in the stereoscopic photographing mode or the panoramic photographing mode is made to coincide in its aspect ratio with the image observed through the viewfinder, and therefore, the determination of the picture design becomes easy.

Although in this embodiment the viewfinder optical system 16 has a variable power effect, it is also possible that the optical magnification of the viewfinder optical system 16 is designed to be constant in all the photographing modes. In this case, when the aspect ratio of the visual field mask 70 is changed from 3:4 to 3:8 by means of the aspect ratio changing unit 20, the deformation of the visual field mask 70 may be made so that the length of the visual field in the vertical direction is set to be constant and the length thereof in the horizontal direction is doubled.

Figure 9:
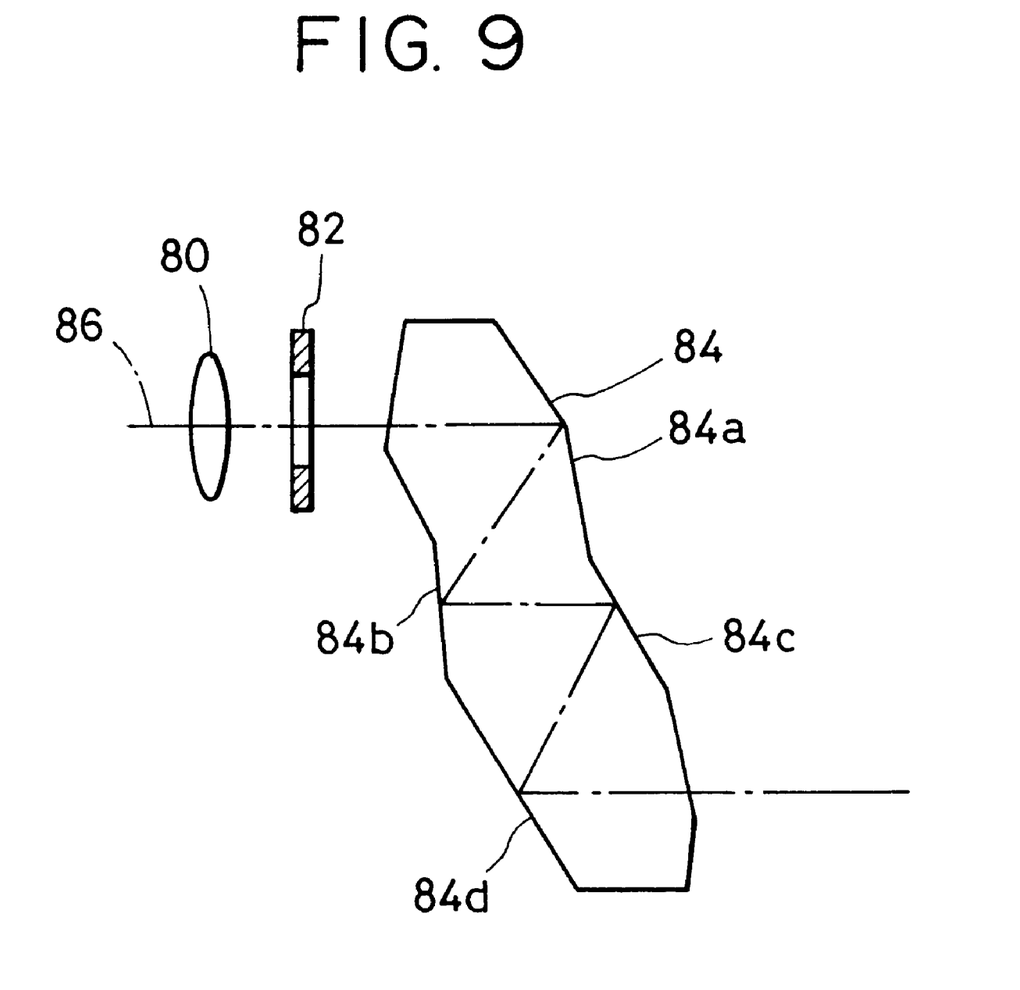
FIG. 9 is an illustration of a second structure of the viewfinder optical system 16 in this embodiment.

Furthermore, this viewfinder optical system 16 can also have a structure shown in FIG. 9 which is a top view showing a modification of the viewfinder optical system 16. In FIG. 9, numeral 80 represents an objective, numeral 82 designates a visual field mask, and numeral 84 is a prism having a positive refracting power. The prism 84 is made by the integral formation of four aspherical eccentric reflecting surfaces 84a to 84d, and also serves as an eyepiece. Further, numeral 86 depicts the optical axis of the viewfinder optical system. The visual field mask 82 is located in the vicinity of the image formation plane of the objective 80. As compared with the common viewfinder in which the lenses are in rotation-symmetry relation to each other, the structure shown in FIG. 9 creates an optical device in which the prism 84 also serves as an eyepiece in a state where the visual field takes an aspect ratio of 3:8, and therefore, the viewfinder optical system 16 can have a compact structure while maintaining the visual field corresponding to an aspect ratio of 3:8.

Figure 10:
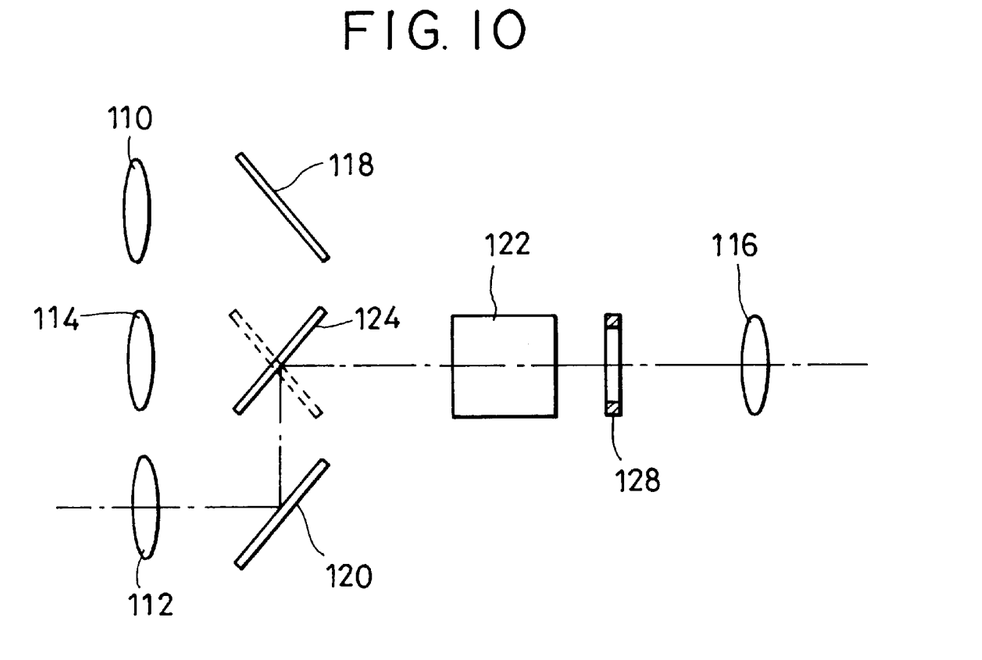
FIG. 10 is a top view showing a third structure of the viewfinder optical system 16 in this embodiment.
Figure 11:
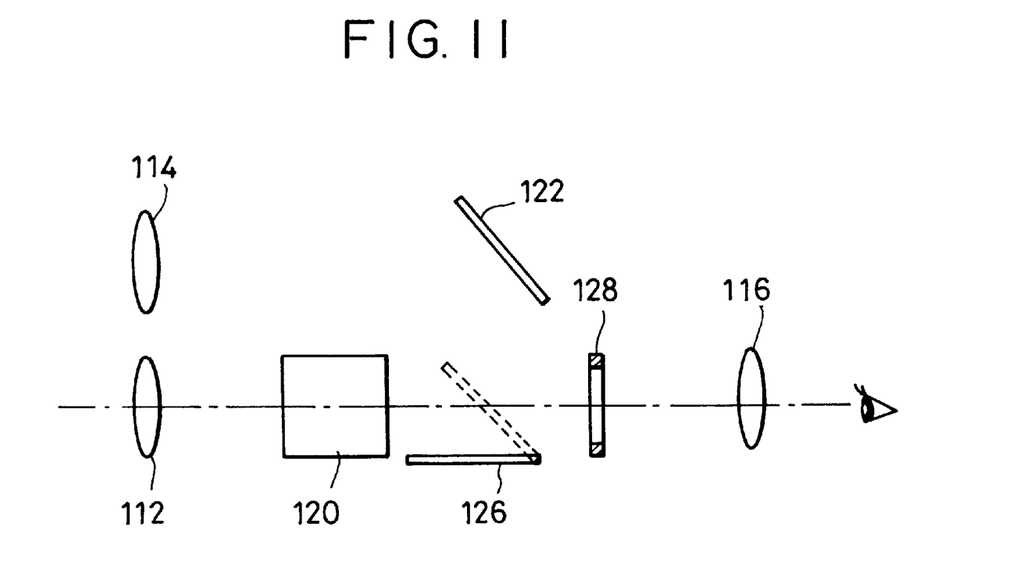
FIG. 11 is a side view showing the third structure of the viewfinder optical system 16 in this embodiment.

Although in FIGS. 4 and 5 there is shown a structure in which the viewfinder optical system 16 includes the variable-power lens 62, it is also acceptable that lenses with different optical magnifications are prepared and the optical path is switched when needed. FIGS. 10 and 11 are respectively a top view and a side view showing structures of the viewfinder optical system 16 which are capable of switching the optical path. In these structures of the viewfinder optical system 16, the viewfinder magnification changing unit 18 functions as a viewfinder optical path switching means.

In FIGS. 10 and 11, numeral 110 denotes a right-hand image pickup system objective and numeral 112 depicts a left-hand image pickup system objective. Both are made of the same material and show the same optical characteristic. The objectives 110, 112 are disposed in a positional relationship in which the right- and left-hand image pickup systems 10R, 10L are slightly moved upwardly in order to accurately confirm the photographing layout by the right- and left-hand image pickup systems 10R, 10L in the stereoscopic photographing mode. Further, numeral 114 signifies an objective for the panoramic photographing, which is set to 0.5 times that of the objectives 110, 112. Numeral 116 represents an eyepiece, and numerals 118, 120, 122, 124 and 126 designate reflecting mirrors, respectively. The reflecting mirror 124 is rotatable around a center line perpendicular to the paper surface of FIG. 10, while the reflecting mirror 126 is rotatable around a line normal to the paper surface of FIG. 11 at an end portion on the photographer side. Still further, numeral 128 signifies a visual field mask having the same structure as that of the visual field mask shown in FIG. 6, with the visual field mask 128 being situated in the vicinity of the image formation planes of the objectives 110, 112.

Figure 12:
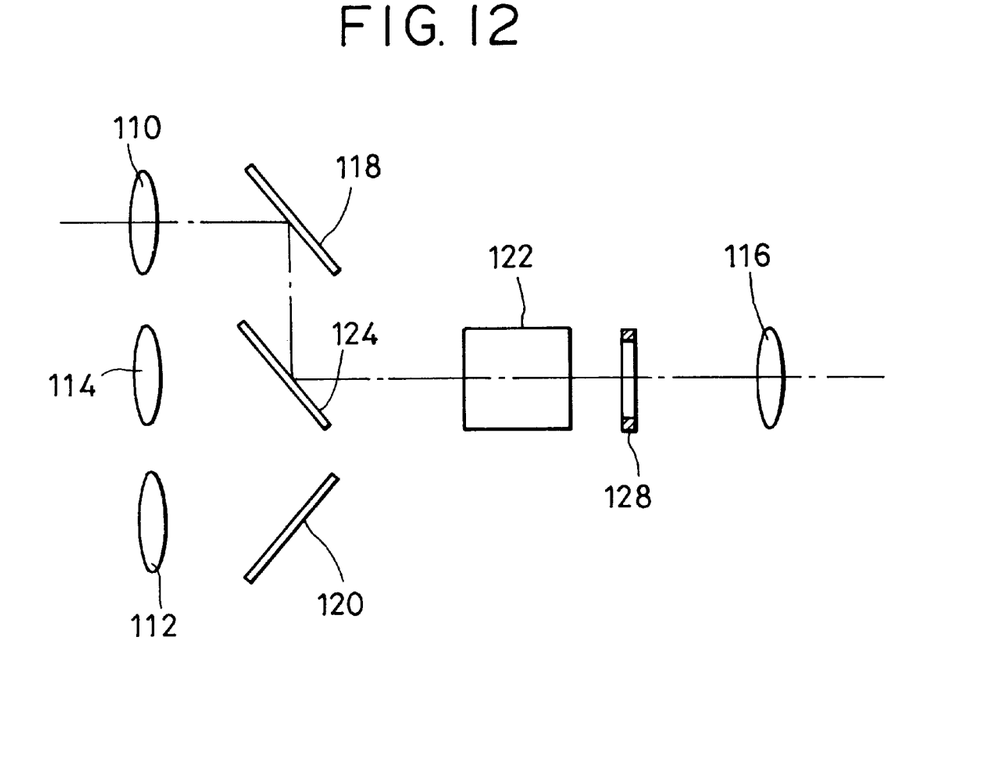
FIG. 12 is a top view showing the viewfinder optical system with the third structure, and showing a state of looking at a right-hand image.
Figure 13:
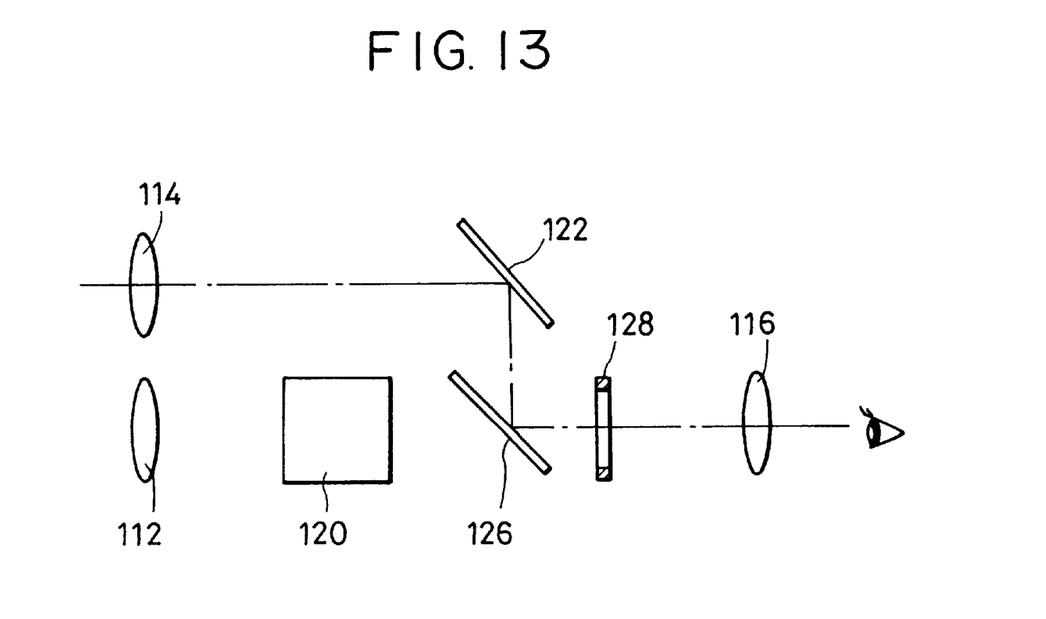
FIG. 13 is an illustration of an optical path in the viewfinder optical system with the third structure in the panoramic photographing mode.

In the viewfinder optical systems shown in FIGS. 10 and 11, in the stereoscopic photographing mode, when the reflecting mirror 124 is set at the position shown in FIG. 10, the photographing layout by the right-hand image pickup system 10R is confirmable, and when the reflecting mirror 124 is turned to the position shown in FIG. 12, the photographing layout by the left-hand image pickup system 10L is confirmable. That is, it is desirable that the reflecting mirror 124 can manually be switched between the position shown in FIG. 10 and the position shown in FIG. 12. In the panoramic photographing mode, as shown in FIG. 13, the reflecting mirror 126 is rotationally lifted by approximately 45 degrees around its end portion. Whereupon, an optical image caused by the objective 114 passes through the visual field mask 128 to be incident on the eye of the photographer. In the ordinary photographing mode, the reflecting mirror 124 is set at the position shown in FIG. 10.

Figure 14:
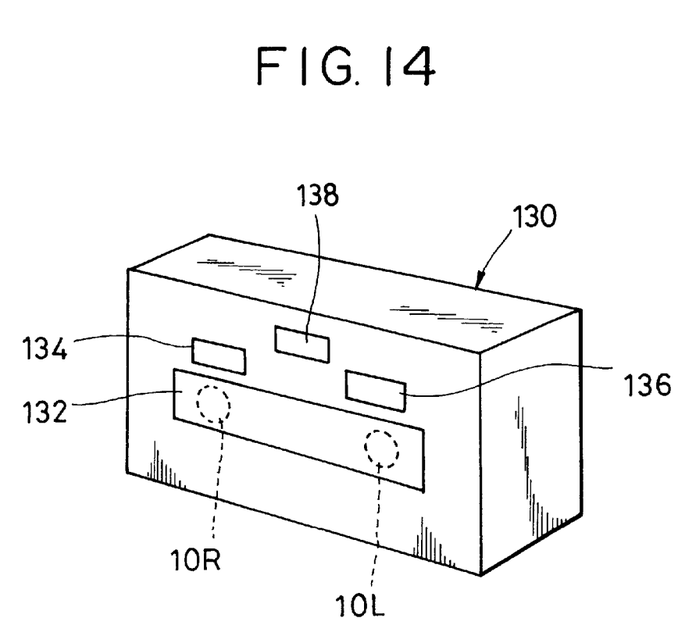
FIG. 14 is a perspective view showing an appearance of this embodiment where a viewfinder optical system 16 is used as the viewfinder optical system shown in FIGS. 10 to 12.

FIG. 14 is a perspective view showing an appearance of a multiple-lens camera using, as the viewfinder optical system 16, the viewfinder optical system shown in FIGS. 10 to 13. In FIG. 14, numeral 130 signifies a camera housing, numeral 132 designates a photographing window for the right- and left image pickup systems 10R, 10L, and also serves as a cover glass for protecting the right- and left image pickup systems 10R, 10L against dust or the like. In addition, numeral 134 represents an observing window for the objective 110, numeral 136 depicts an observing window for the objective 112, and numeral 138 denotes an observing window for the objective 114. Likewise, the visual field of the viewfinder optical system shown in FIGS. 10 to 13 is designed to minimize the parallax with the photographing visual field in the stereoscopic photographing mode and the panoramic photographing mode.

In the viewfinder optical system shown in FIGS. 10 to 13, through the use of the reflecting mirror 124, the visual field of an image taken by the right- and left-hand image pickup systems in the stereoscopic photographing mode is changeable to accommodate observation. As a result, in a manner of switching between the right and left images in the stereoscopic photographing mode, the overlapping area is visually confirmable. Since an optical device constituting a portion of the viewfinder optical system is used by the reflecting mirror 126 for both the panoramic photographing mode and stereoscopic photographing mode, the viewfinder optical system can be made compact.

Figure 15:
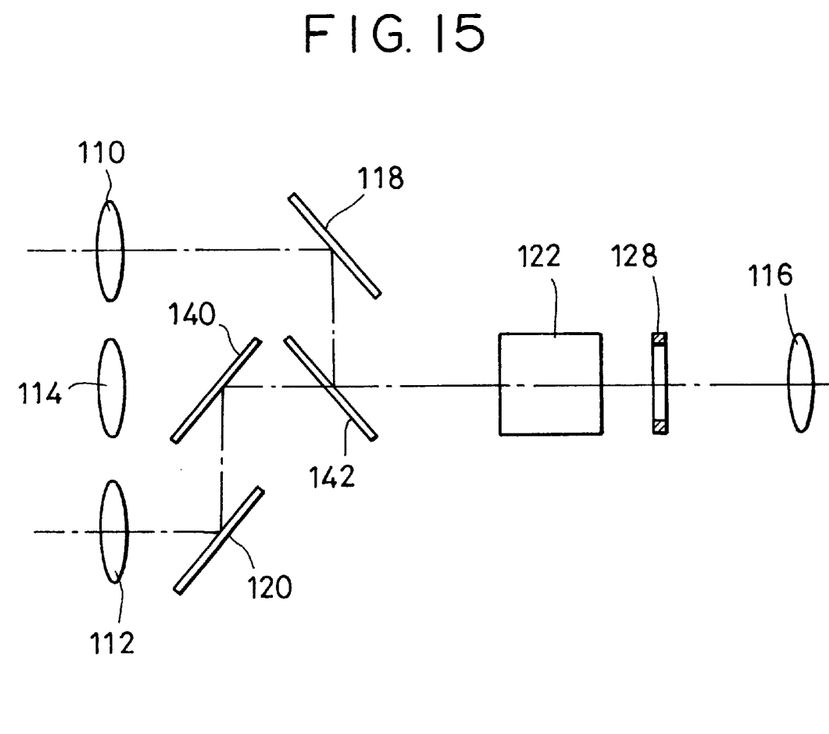
FIG. 15 is a side view showing a fourth structure of the viewfinder optical system in this embodiment.

Furthermore, it is also acceptable that the viewfinder optical system shown in FIGS. 10 to 13 is altered as shown in FIG. 15. In FIG. 15, the same parts as those in FIGS. 10 to 13 are marked with the same numerals. The reflecting mirror 118 is shifted to the front side, a fixed reflecting mirror 140 is placed at a position corresponding to the position of the reflecting mirror 124 to direct a light beam from the reflecting mirror 120 to the visual field mask 128 or the eyepiece 116, and further, a half mirror 142 is located between the reflecting mirror 140 and the visual field mask 128 or the eyepiece 116 to compose a light beam from the reflecting mirror 140 and a light beam from the reflecting mirror 118 to turn the composed light beam to the visual field mask 128.

Since the half mirror 142 is rotatable, the right and left images are observable in an overlapped condition and only the image from the objective lens 112 is observable.

As described above, the subject is accurately observable in each of the stereoscopic photographing mode and panoramic photographing mode, so that the determination of the photographing layout becomes easy. That is, the subject is observable with the substantially same aspect ratio as that of the image pickup system. In addition, the subject is viewable with a small parallax from the image pickup system. Further, a simple structure is realizable and the size reduction becomes feasible.

It should be understood that the foregoing relates to only the preferred embodiment of the present invention, and that it is intended to cover all changes and modifications of the embodiment of the invention herein used for the purpose of the disclosure, which do not constitute departures from the spirit and scope of the invention. The individual components shown in outline or designated by blocks in the drawings are all well known in the art, and their specific construction and operation are not critical to the operation or best mode for carrying out the invention.

What is claimed is:

1. A multiple lens image pickup apparatus comprising:
   a plurality of image pickup systems, each system arranged to allow an angle between optical paths through each of said systems to be changed;
   a control system which selects at least one of a stereoscopic photographing mode in which images taken through said plurality of image pickup systems overlap in a larger proportion and a panoramic photographing mode in which images taken through said plurality of image pickup systems overlap in a smaller proportion; and
   an optical viewfinder which selectively sets an observing range in accordance with the photographing mode selected,
   wherein said optical viewfinder images an object without using said plurality of image pickup systems.

2. A multiple-lens image pickup apparatus according to claim 1, said optical viewfinder comprising an aspect ratio changing means.

3. A multiple-lens image pickup apparatus according to claim 1, said optical viewfinder comprising a plurality of objectives.

4. A multiple-lens image pickup apparatus according to claim 1, said optical viewfinder comprising optical path switching means for switching between an optical path passing through a first objective and an optical path passing through a second objective.

5. A multiple-lens image pickup apparatus according to claim 1, said optical viewfinder comprising a prism having a positive refracting power and having an aspherical eccentric reflecting surface.

6. A multiple-lens image pickup apparatus according to claim 1, said optical viewfinder comprising a visual field mask which makes an observing range changeable, with a visual field of a visual field mask being changed between the stereoscopic photographing mode and the panoramic photographing mode.

7. A multiple-lens image pickup apparatus according to claim 6, said visual field mask including two substantially L-shaped mask plates so that the visual field is changed by changing a configuration of an opening section made by said two substantially L-shaped mask plates.

8. A multiple-lens image pickup apparatus according to claim 2, said aspect ratio changing means comprises a visual field mask which changes an observing range.

9. An image pickup apparatus comprising:
   a plurality of image pickup optical systems;
   supporting means for changing image pickup directions of said plurality of image pickup optical systems;
   control means for controlling said supporting means so that said plurality of image pickup optical systems take a first position where the image pickup directions for each of the plurality of image pickup optical means are parallel, and take a second position where the image pickup directions intersect; and
   a monitor optical system for changing an angle of view between the first and second positions taken by said control means,
   wherein said monitor optical system images an object without using said plurality of image pickup optical systems.

10. An image pickup apparatus according to claim 9, the first position being a stereoscopic image pickup position to be taken by said plurality of image pickup optical systems.

11. An image pickup apparatus according to claim 9, wherein said second position is a panoramic image pickup position to be taken by said image pickup optical systems.

12. An image pickup apparatus according to claim 9, said monitor optical system displaying an image pickup possible range corresponding to each of the first and second positions of said plurality of image pickup optical systems.

13. A multiple-lens image pickup apparatus according to claim 1, wherein said optical viewfinder comprises means for changing a magnification in accordance with the photographing mode selected by said control system.

14. A multiple-lens image pickup apparatus according to claim 1, wherein said optical viewfinder comprises means for changing both a magnification and an aspect ratio in accordance with the photographing mode selected by said control system.

15. A multiple-lens image pickup apparatus according to claim 1, wherein said plurality of image pickup systems receive light from a respective plurality of reflecting mirrors in the panoramic photographic mode.

16. An image pickup apparatus according to claim 11, wherein said plurality of image pickup optical systems receive light from a respective plurality of reflecting mirrors in the second position.

17. A control method for a multiple lens image pickup apparatus which has a plurality of image pickup systems, each system arranged to allow an angle between optical paths through each of the systems to be changed, said method comprising:
   a step of selecting at least one of a stereoscopic photographing mode in which images taken through the plurality of image pickup systems overlap in a larger proportion and a panoramic photographing mode in which images taken through the plurality of image pickup systems overlap in a smaller proportion; and a step of controlling an optical viewfinder to selectively change an observing range in accordance with the photographing mode selected by said selecting step, wherein the optical viewfinder images an object without using the plurality of image pickup systems.

18. A method according to claim 17, wherein said controlling step controls an aspect ratio of the optical viewfinder.

19. A method according to claim 18, wherein said controlling step controls an aspect ratio by moving a visual field mask so as to change an observing range between the stereoscopic photographing mode and the panoramic photographing mode.

20. A method according to claim 19, wherein the visual field mask includes two substantially L-shaped mask plates so that the visual field is changed by changing a configuration of an opening section made by the two substantially L-shaped mask plates.

* * * * *

UNITED STATES PATENT AND TRADEMARK OFFICE
CERTIFICATE OF CORRECTION

PATENT NO. : 6,112,033
DATED : August 29, 2000
INVENTOR(S) : Kotaro Yano, Et al.

Page 1 of 1

It is certified that error appears in the above-identified patent and that said Letters Patent is hereby corrected as shown below:

ON THE COVER PAGE AT [54]
Title: "STEREOSCOPIC" should read --STEREOSCOPIC,--.

Column 1:
Line 3, "STEREOSCOPIC" should read --STEREOSCOPIC,--.
Line 30, "a" should be deleted.

Column 3:
Line 23, "e," should read --θ,--.

Column 4:
Line 59, "equidistance" should read --equidistant--.

Column 7:
Line 4, "3:8 which is in turn, is" should read --3:8, which in turn is--.

Signed and Sealed this

Twelfth Day of June, 2001

*Attest:*

NICHOLAS P. GODICI
*Attesting Officer*    Acting Director of the United States Patent and Trademark Office